United States Patent
Huang et al.

(10) Patent No.: US 9,706,393 B2
(45) Date of Patent: Jul. 11, 2017

(54) METHOD AND DEVICE FOR LOCAL GATEWAY ADDRESS UPDATING

(71) Applicant: ZTE CORPORATION, Shenzhen, Guangdong (CN)

(72) Inventors: Ying Huang, Shenzhen (CN); Feng Xie, Shenzhen (CN); Shuang Liang, Shenzhen (CN)

(73) Assignee: ZTE Corporation (CN)

(*) Notice: Subject to any disclaimer, the term of this patent is extended or adjusted under 35 U.S.C. 154(b) by 6 days.

(21) Appl. No.: 14/394,499

(22) PCT Filed: Aug. 8, 2013

(86) PCT No.: PCT/CN2013/081032
§ 371 (c)(1),
(2) Date: Oct. 15, 2014

(87) PCT Pub. No.: WO2014/026560
PCT Pub. Date: Feb. 20, 2014

(65) Prior Publication Data
US 2015/0071210 A1    Mar. 12, 2015

(30) Foreign Application Priority Data
Aug. 15, 2012 (CN) .......................... 2012 1 0290625

(51) Int. Cl.
*H04W 8/26* (2009.01)
*H04L 29/12* (2006.01)
(Continued)

(52) U.S. Cl.
CPC .......... *H04W 8/26* (2013.01); *H04L 61/2007* (2013.01); *H04W 8/082* (2013.01);
(Continued)

(58) Field of Classification Search
None
See application file for complete search history.

(56) References Cited

U.S. PATENT DOCUMENTS 8,730,918 B2    5/2014 Huang
2003/0161287 A1    8/2003 Venkitaraman et al.
(Continued)

FOREIGN PATENT DOCUMENTS

CN    101626565    1/2010
CN    101674336    3/2010
(Continued)

OTHER PUBLICATIONS

International Search Report for PCT/CN2013/081032, English translation attached to original, Both completed by the Chinese Patent Office on Oct. 15, 2013, All together 7 Pages.
(Continued)

*Primary Examiner* — Anh Ngoc Nguyen
(74) *Attorney, Agent, or Firm* — Brooks Kushman P.C.

(57) ABSTRACT

The present document discloses a method and apparatus for updating a local gateway (LGW) address. The method may include a destination donor NodeB receiving local gateway address assignment information and, according to the local gateway address assignment information, if the destination donor NodeB determines that an IP address is required to be assigned to a local gateway co-located in a mobile relay node, then assigning an IP address to the local gateway, and sending the IP address of the local gateway to a service gateway. An apparatus, located in the destination donor NodeB, may include a receiving module, an assigning module, and a sending module. Another apparatus, located in the mobile relay node, may include a judgment module and a storage module. Another apparatus, located in the
(Continued)

service gateway servicing a UE, may include a receiving module and an updating module.

20 Claims, 6 Drawing Sheets

(51) Int. Cl.
    *H04W 8/08* (2009.01)
    *H04W 84/04* (2009.01)
    *H04W 88/16* (2009.01)
    *H04W 84/00* (2009.01)

(52) U.S. Cl.
    CPC ........ *H04W 84/005* (2013.01); *H04W 84/047* (2013.01); *H04W 88/16* (2013.01)

(56) References Cited

U.S. PATENT DOCUMENTS

| 2010/0272013 | A1* | 10/2010 | Horn | H04W 76/022 |
| | | | | 370/328 |
| 2012/0003962 | A1 | 1/2012 | Jeon et al. | |
| 2012/0189016 | A1 | 7/2012 | Bakker et al. | |
| 2012/0224536 | A1* | 9/2012 | Hahn | H04L 45/00 |
| | | | | 370/328 |
| 2013/0003697 | A1* | 1/2013 | Adjakple | H04W 36/0011 |
| | | | | 370/331 |

FOREIGN PATENT DOCUMENTS

| CN | 101729337 | 6/2010 |
| CN | 101998554 | 3/2011 |
| CN | 102457931 | 5/2012 |
| CN | 102801822 | 11/2012 |

OTHER PUBLICATIONS

Extended European Search Report for PCT/CN2013/081032, Completed by the European Patent Office, Dated Jul. 6, 2015, 11 Pages.
3GPP TSG-RAN WG3 No. 77, R3-121792, XP 050669595, Institute for Information Industry (III), Aug. 13-17, 2012, 6 Pages, "Discussion on Mobile Relay Architecture for LIPA and SIPTO support."
3GPP TR 36.836, V1.0.0 (May 2012), XP 050580685, Release 11, 36 Pages, "3rd Generation Partnership Project; Technical Specification Group Radio Access Network; Mobile Ray for E-UTRA."

* cited by examiner

METHOD AND DEVICE FOR LOCAL GATEWAY ADDRESS UPDATING

CROSS-REFERENCE TO RELATED APPLICATION

This application is the U.S. national phase of PCT Appln. No. PCT/CN2013/081032 filed Aug. 8, 2013 which claims priority to Chinese Application No. 201210290625.7 filed Aug. 15, 2012, the disclosures of which are incorporated in their entirety by reference herein.

TECHNICAL FIELD

The present document relates to the local gateway address updating technology, and in particular, to a method and apparatus for updating a local gateway address.

BACKGROUND

In the Wireless Relay technology in the Advanced long term evolution (LTE-Advanced) standard released by the 3GPP standard organization, the Relay Node (RN) provides the function and service similar to those provided by the common evolved NodeB (eNB) to the UE accessing to its cell, and accesses in a way similar to the common UE a donor Node Bdonor (DeNB) which serves it through the air interface. As the high-speed railway is built and put into operation on a large scale, the demand for communicating on the train is increasing constantly. But because the high-speed moving train is influenced by the Doppler shift, the frequent cell handover and the large penetration loss of the high-speed rail carriage, etc., the coverage of the existing network NodeB is very difficult to meet the communication quality demand of the high-speed train. So the industry proposes deploying the relay node on the high-speed train, and this kind of relay node is usually called the Mobile Relay Node (MRN). As shown in FIG. 1, through the mobile relay technology, it can make the users (UE1 and UE2) in the high-speed train perform the communication with the relatively rest MRN, and the MRN can be handed over among different DeNBs in the process of moving with the high-speed train, thus avoiding the simultaneous handover of a large number of users in the carriage of the high-speed train and guaranteeing the communication quality between the UE and the MRN; in addition, through enhancing the backbone connection between the mobile RN and the DeNB, it can better solve a series of problems existed in the high-speed rail.

If the MRN adopts the framework as shown in FIG. 1 (that is, the framework same with the already standardized R10 fix relay, usually called the framework 2), to reduce the delay of the UE data, it can consider the routing optimization scheme. When the MRN moves farther from the initial DeNB, the gateway (GW) of the MRN is handed over to the built-in gateway of the DeNB which serves the MRN. As shown in FIG. 2, before the MRN is handed over, its GW is located on the DeNB1, and the MRN is provided with the NodeB function service by the DeNB3; the data of the UE reaches the GW function of the DeNB1 at first, and then is routed to the NodeB function of the DeNB3 through the DeNB2, and the MRN can reposition its GW to the built-in GW of the DeNB4 in the handover process, thus making the data of the UE reach the DeNB4 directly, shortening the path length, and reducing the data delay.

In addition, in order to better meet the user demand and further promote the user experience, the 3GPP considers that the MRN supports the local IP access (LIPA) function to provide the high-speed local service for the LTE UE and save the bandwidth resources of the backhaul link of the air interface. For example, the UE can connect the local packet data network (PDN) through a co-located local gateway (is abbreviated as LGW) in the MRN to obtain the multimedia resources, or support the multi-user social network application, such as file-sharing, chat, game, etc., through the local server. FIG. 1 is a framework diagram that the MRN supports the LIPA function in the high-speed train scene. As shown in FIG. 1, the LGW function entity is co-located in the MRN node in the carriage, and the data are received and sent through a Un air interface between the MRN and the DeNB. The LGW is connected with the PDN network through the SGi interface. For the UE in the connection status that the LIPA connection exists, there is a direct tunnel used for the LIPA service data between the LGW and the MRN, and the LGW in the MRN establishes the S5 interface core network tunnel through the DeNB and the UE service gateway (SGW), used for the paging of the UE in the IDLE status and the S5 signaling transmission.

In the scene of the home NodeB (HeNB) supporting the LIPA, the address of the LGW co-located in the HeNB is assigned by the security gateway (SeGW) during the IPSec tunnel establishment process. But in the situation of the MRN supporting the LIPA, the MRN is not connected to the SeGW network element. And in the situation that the LGW and the MRN are not co-located, all data sent by the network element of the core network to the LGW must be routed through the gateway of the MRN packet data network (PGW), and then they could arrive. So, in the situation of the MRN supporting the LIPA, if the MRN PGW is repositioned during the handover process of the MRN, the S5 data associated to the LIPA service sent from the UE SGW cannot arrive at the MRN PGW smoothly to be routed to the LGW, which causes the S5 connection disconnect.

SUMMARY

The technical problem that the embodiment of the present document requires to solve is to provide a method and apparatus for updating a local gateway address, which can solve the problem of updating the LGW address in the handover process under the situation that the MRN PGW is repositioned.

In order to solve the above-mentioned problem, the following technical scheme is adopted.

A method for updating a local gateway address comprises:

a destination donor NodeB receiving local gateway address assignment information;

according to the local gateway address assignment information, if the destination donor NodeB determines that an IP address is required to be assigned to a local gateway co-located in a mobile relay node, then assigning an IP address to the local gateway; and sending the IP address of the local gateway to a service gateway.

Alternatively, the method further comprises: if the destination donor NodeB does not receive the local gateway address assignment information, then the destination donor NodeB not assigning the IP address for the local gateway; when determining that the mobile relay node supports a local IP access (LIPA) function, storing the IP address of the mobile relay node as the IP address of the local gateway; if the mobile relay node determines that the IP address of the local gateway is not received and the present mobile relay node supports the LIPA function, then storing an IP address of the mobile relay node as the IP address of the local gateway.

Alternatively, the method further comprises: if the destination donor NodeB determines that the IP address is not required to be assigned for the local gateway co-located in the mobile relay node according to the local gateway address assignment information, then the destination donor NodeB not assigning the IP address for the local gateway; when determining that the mobile relay node supports a local IP access (LIPA) function, storing the IP address of the mobile relay node as the IP address of the local gateway; if the mobile relay node determines that the IP address of the local gateway is not received and the present mobile relay node supports the LIPA function, then storing an IP address of the mobile relay node as the IP address of the local gateway.

Alternatively, the destination donor NodeB judges whether the mobile relay node supports the LIPA function by adopting the following ways:

the destination donor NodeB judging whether having received mobile relay node LIPA function support indication information from a source donor NodeB, wherein, the mobile relay node LIPA function support indication information is used for indicating whether the mobile relay node supports the LIPA function;

if the destination donor NodeB receives the mobile relay node LIPA function support indication information and the mobile relay node LIPA function support indication information indicates that the mobile relay node supports the LIPA function, then the destination donor NodeB determining that the mobile relay node supports the LIPA function; and if the destination donor NodeB receives the mobile relay node LIPA function support indication information and the mobile relay node LIPA function support indication information indicates that the mobile relay node does not support the LIPA function, or the destination donor NodeB does not receive the mobile relay node LIPA function support indication information, then the destination donor NodeB determining that the mobile relay node does not support the LIPA function.

Alternatively, the step of the destination donor NodeB receiving the local gateway address assignment information comprising:

the destination donor NodeB receiving an X2 interface handover request message carrying the local gateway address assignment information sent by a source donor NodeB of the mobile relay node; or, the destination donor NodeB receiving an S1 interface handover request message carrying the local gateway address assignment information sent by a mobile management entity (MME), wherein, the MME is an MME that serves the mobile relay node, and the local gateway address assignment information in the S1 interface handover request message is sent to the MME from the source donor NodeB.

Alternatively, the local gateway address assignment information comprises at least one of following: a local gateway address assignment indication, and a local gateway address type;

wherein, the local gateway address assignment indication is used for indicating whether the IP address is required to be assigned to the local gateway, and the local gateway address type is used for indicating a type of the IP address of the local gateway required to be assigned.

Alternatively, the step of according to the local gateway address assignment information, if the destination donor NodeB determines that an IP address is required to be assigned to a local gateway co-located in a mobile relay node, then assigning an IP address to the local gateway comprises:

the destination donor NodeB determining that the local gateway address assignment information only comprises the local gateway address assignment indication, and the local gateway address assignment indication indicating that the IP address is required to be assigned to the local gateway, then a data packet gateway serving the mobile relay node in the destination donor NodeB assigning the IP address for the local gateway co-located in the mobile relay node, wherein, the type of the IP address is the same as the type of the IP address of the mobile relay node; or, the destination donor NodeB determining that the local gateway address assignment information comprises the local gateway address assignment indication and the local gateway address type, and the local gateway address assignment indication indicating that the IP address is required to be assigned to the local gateway, then the data packet gateway serving the mobile relay node in the destination donor NodeB assigning the IP address for the local gateway co-located in the mobile relay node, wherein, the type of the IP address is a type indicated by the local gateway address type; or the destination donor NodeB determining that the local gateway address assignment information only comprises the local gateway address type, then the data packet gateway serving the mobile relay node in the destination donor NodeB assigning the IP address for the local gateway co-located in the mobile relay node, wherein, the type of the IP address is a type indicated by the local gateway address type.

Alternatively, after the destination donor NodeB assigns the IP address for the local gateway, the method further comprises:

the destination donor NodeB sending the IP address assigned for the local gateway to the source donor NodeB, and the source donor NodeB sending the IP address of the local gateway to the mobile relay node; or, the destination donor NodeB sending the IP address assigned for the local gateway to the mobile relay node directly.

Alternatively, the step of the destination donor NodeB sending the IP address assigned for the local gateway to the source donor NodeB comprises:

the destination donor base sending the IP address assigned for the local gateway to the source donor NodeB directly; or, the destination donor NodeB sending the IP address assigned for the local gateway to the source donor NodeB through the MME.

Alternatively, the step of the source donor NodeB sending the IP address of the local gateway to the mobile relay node comprises:

the source donor NodeB sending the IP address of the local gateway to the mobile relay node through a radio resource control (RRC) message, an S1 interface message or an X2 interface message.

Alternatively, the step of the destination donor NodeB sending the IP address of the local gateway to the mobile relay node directly:

the destination donor NodeB sending the IP address of the local gateway to the mobile relay node through a radio resource control (RRC) message, an S1 interface message or an X2 interface message.

Alternatively, the step of sending the IP address of the local gateway to the service gateway comprises:

the destination donor NodeB receiving a first S1 interface message sent by the mobile relay node, sending a second S1 interface message to the MME serving the UE, wherein, both the first S1 interface message and the second S1 interface message comprise the IP address of the local gateway, and the UE is a UE accessing the mobile relay node; and the MME sending a first S11 interface message to the service gateway serving the UE, in order to make the service gateway update the IP address of the local gateway stored locally, wherein, the first S11 interface message comprises the IP address of the local gateway.

Alternatively, both the first S1 interface message and the second S1 interface message adopt a path shift request message, and the first S11 interface message adopts a bearing modification request message or a conversation establishment request message.

Alternatively, the step of sending the IP address of the local gateway to the service gateway comprises:

the destination donor NodeB sending a third S1 interface message to the MME serving the UE, wherein, the third S1 interface message comprises the IP address of the local gateway, and the UE is the UE accessing the mobile relay node; the MME sending a second S11 interface message to the service gateway serving the UE, in order to make the service gateway update the IP address of the local gateway stored locally, wherein, the second S11 interface message comprises the IP address of the local gateway.

Alternatively, the third S1 interface message adopts a path shift request message; and the second S11 interface message adopts a bearing modification request message or a conversation establishment request message.

An apparatus for updating a local gateway address, located in a destination donor NodeB, comprises a receiving module, an assigning module and a sending module, wherein:

the receiving module is configured to: receive local gateway address assignment information;

the assigning module is configured to: according to the local gateway address assignment information, if determining that an IP address is required to be assigned to a local gateway co-located in a mobile relay node, then assign an IP address to the local gateway; and the sending module is configured to: send the IP address of the local gateway to a service gateway.

Alternatively, the assigning module is further configured to:

when the receiving module does not receive the local gateway address assignment information, then not assign the IP address for the local gateway; and when determining that the mobile relay node supports a local IP access (LIPA) function, store the IP address of the mobile relay node as the IP address of the local gateway.

Alternatively, the assigning module is further configured to:

if determining that the IP address is not required to be assigned for the local gateway co-located in the mobile relay node according to the local gateway address assignment information, then not assign the IP address for the local gateway; and when determining that the mobile relay node supports a local IP access (LIPA) function, store the IP address of the mobile relay node as the IP address of the local gateway.

Alternatively, the assigning module is configured to judge whether the mobile relay node supports the LIPA function by adopting the following ways:

the assigning module judging whether having received mobile relay node LIPA function support indication information from a source donor NodeB, wherein, the mobile relay node LIPA function support indication information is used for indicating whether the mobile relay node supports the LIPA function;

if the assigning module receives the mobile relay node LIPA function support indication information and the mobile relay node LIPA function support indication information indicates that the mobile relay node supports the LIPA function, then the assigning module determining that the mobile relay node supports the LIPA function; and if the assigning module receives the mobile relay node LIPA function support indication information and the mobile relay node LIPA function support indication information indicates that the mobile relay node does not support the LIPA function, or the assigning module does not receive the mobile relay node LIPA function support indication information, then the assigning module determining that the mobile relay node does not support the LIPA function.

Alternatively, the receiving module is configured to receive the local gateway address assignment information by the following ways:

the receiving module receiving an X2 interface handover request message carrying the local gateway address assignment information sent by a source donor NodeB of the mobile relay node; or, the receiving module receiving an S1 interface handover request message carrying the local gateway address assignment information sent by a mobile management entity (MME), wherein, the MME is an MME that serves the mobile relay node, and the local gateway address assignment information in the S1 interface handover request message is sent to the MME from the source donor NodeB.

Alternatively, the local gateway address assignment information comprises at least one of following: a local gateway address assignment indication, and a local gateway address type;

wherein, the local gateway address assignment indication is used for indicating whether the IP address is required to be assigned to the local gateway, and the local gateway address type is used for indicating a type of the IP address of the local gateway required to be assigned.

Alternatively, the assigning module is configured to: according to the local gateway address assignment information, if determining that an IP address is required to be assigned to a local gateway co-located in a mobile relay node, then assign an IP address to the local gateway by the following ways:

the assigning module determining that the local gateway address assignment information only comprises the local gateway address assignment indication, and the local gateway address assignment indication indicating that the IP address is required to be assigned to the local gateway, then the assigning module assigning the IP address for the local gateway co-located in the mobile relay node, wherein, the type of the IP address is the same as the type of the IP address of the mobile relay node; or, the assigning module determining that the local gateway address assignment information comprises the local gateway address assignment indication and the local gateway address type, and the local gateway address assignment indication indicating that the IP address is required to be assigned to the local gateway, then the assigning module assigning the IP address for the local gateway co-located in the mobile relay node, wherein, the type of the IP address is a type indicated by the local gateway address type; or the assigning module determining that the local gateway address assignment information only comprises the local gateway address type, then the assigning module assigning the IP address for the local gateway co-located in the mobile relay node, wherein, the type of the IP address is a type indicated by the local gateway address type.

Alternatively, the sending module is further configured to:

after the assigning module assigns the IP address for the local gateway, send the IP address assigned for the local gateway to the source donor NodeB, to make the source donor NodeB send the IP address of the local gateway to the mobile relay node; or, after the assigning module assigns the IP address for the local gateway, send the IP address assigned for the local gateway to the mobile relay node directly.

Alternatively, the sending module is configured to send the IP address assigned for the local gateway to the source donor NodeB by the following ways:

the sending module sending the IP address assigned for the local gateway to the source donor NodeB directly; or, the sending module sending the IP address assigned for the local gateway to the source donor NodeB through the MME.

Alternatively, the sending module is configured to send the IP address assigned for the local gateway to the mobile relay node directly after the assigning module assigns the IP address for the local gateway by the following ways:

the sending module sending the IP address of the local gateway to the mobile relay node through a radio resource control (RRC) message, an S1 interface message or an X2 interface message.

Alternatively, the sending module is configured to send the IP address of the local gateway to the service gateway by the following ways:

the sending module receiving a first S1 interface message sent by the mobile relay node, sending a second S1 interface message to the MME serving the UE, wherein, both the first S1 interface message and the second S1 interface message comprise the IP address of the local gateway, and the UE is a UE accessing the mobile relay node; and sending the IP address of the local gateway to the service gateway serving the UE through the MME.

Alternatively, both the first S1 interface message and the second S1 interface message adopt a path shift request message.

Alternatively, the sending module is configured to send the IP address of the local gateway to the service gateway by the following ways:

the sending module sending a third S1 interface message to the MME serving the UE, wherein, the third S1 interface message comprises the IP address of the local gateway, and the UE is the UE accessing the mobile relay node; and sending the IP address of the local gateway to the service gateway serving the UE through the MME.

Alternatively, the third S1 interface message adopts a path shift request message.

An apparatus for updating a local gateway address, located in a mobile relay node, comprises a judgment module and a storage module, wherein:

the judgment module is configured to: judge whether having received an IP address of a local gateway; and the storage module is configured to: store the IP address of the local gateway when the judgment module determines that the IP address of the local gateway is received, and store the IP address of the mobile relay node as the IP address of the local gateway when the judgment module determines that the IP address of the local gateway is not received and determines that a present mobile relay node supports a local IP access (LIPA) function.

Alternatively, the apparatus further comprises a sending module, wherein:

the sending module is configured to: send a first S1 interface message to a destination donor NodeB, wherein, the first S1 interface message comprises the IP address of the local gateway.

Alternatively, the first S1 interface message adopts a path shift request message.

An apparatus for updating a local gateway address, located in a service gateway serving for a user equipment (UE), comprises a receiving module and an updating module, wherein:

the receiving module is configured to: receive an S11 interface message sent by a mobile management entity (MME); wherein, the S11 interface message comprises an IP address of a local gateway co-located in a mobile relay node; and the updating module is configured to: update the IP address of the local gateway stored locally.

By using the method and apparatus of the embodiment of the present document, under the situation that the MRN supports the LIPA and the PGW serving the MRN is repositioned in the MRN handover process, it can solve the problem of updating the LGW address in the handover process, in order to guarantee the continuity of the S5 connection, and then guarantee the service continuity of the terminal.

PREFERRED EMBODIMENTS OF THE PRESENT DOCUMENT

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

Embodiment 1

Figure 1:
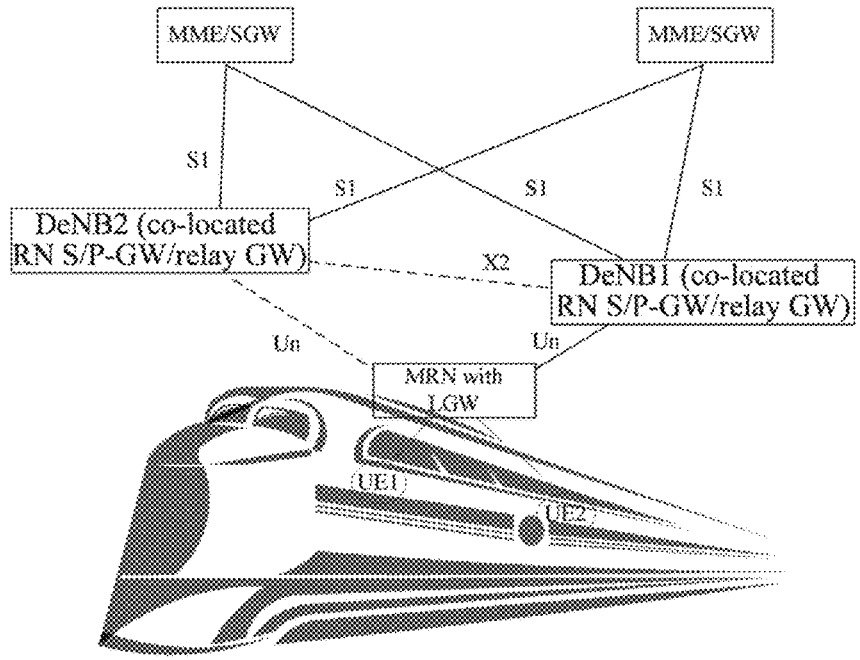
FIG. 1 is a system framework diagram of a mobile relay support the LIPA function in a high-speed rail scene.
Figure 2:
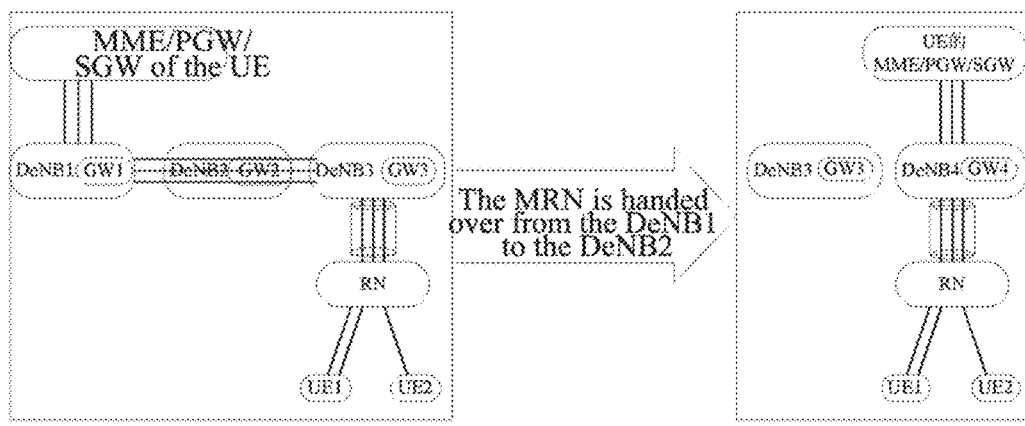
FIG. 2 is a diagram of handing over MRN after the routing optimization in an MRN framework 2.
Figure 3:
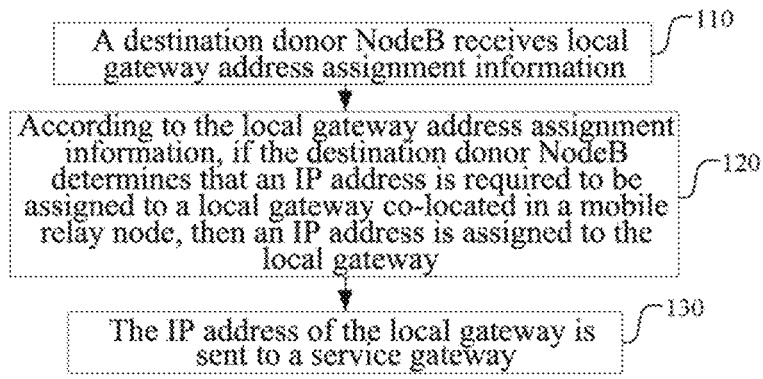
FIG. 3 is a flow chart of embodiment 1 of the present document.

The present embodiment describes a method for updating a local gateway address. In the present embodiment, an S-GW and a P-GW of a mobile relay node is built in the DeNB, as shown in FIG. 3, including the following steps.

In step 110, a destination donor NodeB receives local gateway address assignment information.

Alternatively, during the process that the mobile relay is handed over, the destination donor NodeB determines whether having received the local gateway address assignment information; if it is received, then step 120 is executed; if the local gateway address assignment information is not received, then the destination donor NodeB does not assign the IP address for the local gateway; when determining that the mobile relay node supports a local IP access (LIPA) function, the IP address of the mobile relay node is stored as the IP address of the local gateway, and step 130 is executed.

The destination donor NodeB judges whether the mobile relay node supports the LIPA function by adopting the following ways: the destination donor NodeB judging whether having received mobile relay node LIPA function support indication information from a source donor NodeB, wherein, the indication information is used for indicating whether the mobile relay node supports the LIPA function; if the destination donor NodeB receives the indication information and the indication information indicates that the mobile relay node supports the LIPA function, then the destination donor NodeB determining that the mobile relay node supports the LIPA function; and if the destination donor NodeB receives the indication information and the indication information indicates that the mobile relay node does not support the LIPA function, or the destination donor NodeB does not receive the indication information, then the destination donor NodeB determining that the mobile relay node does not support the LIPA function.

For the mobile relay node, if the mobile relay node determines that the IP address of the local gateway is not received and the present mobile relay node supports the LIPA function, then an IP address of the mobile relay node can be stored as the IP address of the local gateway. The local gateway and the mobile relay node are co-located and configured in the mobile relay node.

The destination donor NodeB receives the local gateway address assignment information by any one of the following two ways: way one, the destination donor NodeB receiving an X2 interface handover request message carrying the local gateway address assignment information sent by a source donor NodeB of the mobile relay node; way two, the destination donor NodeB receiving an S1 interface handover request message carrying the local gateway address assignment information sent by a mobile management entity (MME), wherein, the MME is an MME that serves the mobile relay node, and the local gateway address assignment information in the S1 interface handover request message is sent to the MME from the source donor NodeB.

The local gateway address assignment information includes at least one of following: a local gateway address assignment indication and a local gateway address type; wherein, the local gateway address assignment indication is used for indicating whether the IP address is required to be assigned to the local gateway, and the local gateway address type is used for indicating a type of the IP address of the local gateway required to be assigned.

In step 120, according to the local gateway address assignment information, if the destination donor NodeB determines that an IP address is required to be assigned to a local gateway co-located in a mobile relay node, then an IP address is assigned to the local gateway.

If the destination donor NodeB determines that the IP address is not required to be assigned to the local gateway co-located in the mobile relay node according to the local gateway address assignment information, then the destination donor NodeB does not assign the IP address for the local gateway; when determining that the mobile relay node supports the LIPA function, the IP address of the mobile relay node is stored as the IP address of the local gateway, and step 130 is executed. The method for the destination donor NodeB to judge whether the mobile relay node supports the LIPA function refers to the description in step 110. For the mobile relay node, if it determines that the IP address of the local gateway is not received and the present mobile relay node supports the LIPA function, then an IP address of the mobile relay node is stored as the IP address of the local gateway.

The destination donor NodeB assigns the IP address to the local gateway according to the local gateway address assignment information, including the following steps.

If the destination donor NodeB determines that the local gateway address assignment information only includes the local gateway address assignment indication, and the local gateway address assignment indication indicates that the IP address is required to be assigned to the local gateway, then a data packet gateway serving the mobile relay node in the destination donor NodeB assigns the IP address for the local gateway co-located in the mobile relay node, wherein, the type of the assigned IP address is the same as the type of the IP address of the mobile relay node;

the destination donor NodeB determines that the local gateway address assignment information includes the local gateway address assignment indication and the local gateway address type, and the local gateway address assignment indication indicates that the IP address is required to be assigned to the local gateway, then the data packet gateway serving the mobile relay node in the destination donor NodeB assigns the IP address for the local gateway co-located in the mobile relay node, wherein, the type of the assigned IP address is a type indicated by the local gateway address type; or the destination donor NodeB determines that the local gateway address assignment information only includes the local gateway address type, then the data packet gateway serving the mobile relay node in the destination donor NodeB assigns the IP address for the local gateway co-located in the mobile relay node, wherein, the type of the assigned IP address is a type indicated by the local gateway address type.

The above-mentioned process omits the interaction between the destination donor NodeB and the data packet gateway. Because the data packet gateway is configured in the destination donor NodeB, when the destination donor NodeB determines that the IP address is required to be assigned for the local gateway co-located in the mobile relay node, it will notify the data packet gateway through an internal interface and message.

In step 130, the IP address of the local gateway is sent to a service gateway.

Alternatively, after the destination donor NodeB assigns the IP address for the local gateway, the destination donor NodeB sends the IP address assigned for the local gateway to the source donor NodeB (sending to the source donor NodeB directly or sending through the MME), and the source donor NodeB sends the IP address of the local gateway to the mobile relay node (for example, sending through a radio resource control (RRC) message or an S1 interface message or an X2 interface message); or, the destination donor NodeB sends the IP address assigned for the local gateway to the mobile relay node directly (for example, sending through the RRC message or the S1 interface message or the X2 interface message).

It can adopt any one of the following ways to send the IP address of the local gateway to the service gateway:

in way one, the destination donor NodeB receives a first S1 interface message sent by the mobile relay node, sends a second S1 interface message to the MME serving the UE, wherein, both the first S1 interface message and the second S1 interface message include the IP address of the local gateway, and the above-mentioned UE is a UE accessing the mobile relay node; and the MME sends a first S11 interface message to the service gateway serving the UE, in order to make the service gateway update the IP address of the local gateway stored locally, wherein, the first S11 interface message includes the IP address of the local gateway.

The contents of the above-mentioned first S1 interface message and second S1 interface message may be slightly different, but they preferably adopt a path shift request message, and the first S11 interface message preferably adopts a bearing modification request message or a conversation establishment request message.

In way two, the destination donor NodeB sends a third S1 interface message to the MME serving the UE, wherein, the third S1 interface message includes the IP address of the local gateway, and the UE is the UE accessing the mobile relay node; the MME sends a second S11 interface message to the service gateway serving the UE, in order to make the service gateway update the IP address of the local gateway stored locally, wherein, the second S11 interface message includes the IP address of the local gateway.

The third S1 interface message preferably adopts a path shift request message; and the second S11 interface message preferably adopts a bearing modification request message or a conversation establishment request message.

The above-mentioned way one sends the IP address of the local gateway to the service gateway through the procedure initiated by the mobile relay node. The way two sends the IP address of the local gateway to the service gateway through the procedure initiated by the destination donor NodeB. The IP address of the local gateway mentioned in the present step may be the IP address assigned for the local gateway by the destination donor NodeB in step 120, and also may be the IP address of the mobile relay node which is regarded as the IP address of the local gateway.

Embodiment 2

Figure 4:
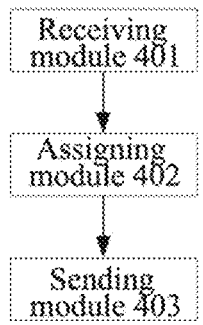
FIG. 4 is a structure diagram of a destination donor NodeB of embodiment 2 of the present document.

The present embodiment describes an apparatus for realizing updating a local gateway address. The apparatus is located in a destination donor NodeB, as shown in FIG. 4, including a receiving module 401, an assigning module 402 and a sending module 403, wherein:

the receiving module 401 is configured to: receive local gateway address assignment information.

Preferably, the receiving module 401 is configured to receive an X2 interface handover request message carrying the local gateway address assignment information sent by a source donor NodeB of the mobile relay node; or, receive an S1 interface handover request message carrying the local gateway address assignment information sent by a mobile management entity (MME), wherein, the MME is an MME that serves the mobile relay node, and the local gateway address assignment information in the S1 interface handover request message is sent to the MME from the source donor NodeB.

The local gateway address assignment information includes at least one of following: a local gateway address assignment indication, and a local gateway address type; wherein, the local gateway address assignment indication is used for indicating whether the IP address is required to be assigned to the local gateway, and the local gateway address type is used for indicating a type of the IP address of the local gateway required to be assigned.

The assigning module 402 is configured to: according to the local gateway address assignment information, if determining that an IP address is required to be assigned to a local gateway co-located in a mobile relay node, then assign an IP address to the local gateway.

Preferably, the assigning module 402 is further configured to: when the receiving module 401 does not receive the local gateway address assignment information, then not assign the IP address for the local gateway; and when determining that the mobile relay node supports a local IP access (LIPA) function, store the IP address of the mobile relay node as the IP address of the local gateway.

Preferably, the assigning module 402 is further configured to: if determining that the IP address is not required to be assigned for the local gateway co-located in the mobile relay node according to the local gateway address assignment information, then not assign the IP address for the local gateway; and when determining that the mobile relay node supports a local IP access (LIPA) function, store the IP address of the mobile relay node as the IP address of the local gateway.

Preferably, the assigning module 402 judges whether the mobile relay node supports the LIPA function by adopting the following ways:

the assigning module 402 judging whether having received mobile relay node LIPA function support indication information from a source donor NodeB, wherein, the indication information is used for indicating whether the mobile relay node supports the LIPA function; if the assigning module 402 receives the indication information and the indication information indicates that the mobile relay node supports the LIPA function, then the assigning module 402 determining that the mobile relay node supports the LIPA function; and if the assigning module 402 receives the indication information and the indication information indicates that the mobile relay node does not support the LIPA function, or the assigning module 402 does not receive the indication information, then the assigning module 402 determining that the mobile relay node does not support the LIPA function.

The assigning module 402 can assign the IP address for the local gateway by the one of the following ways:

the assigning module 402 determining that the local gateway address assignment information only includes the local gateway address assignment indication, and the local gateway address assignment indication indicating that the IP address is required to be assigned to the local gateway, then assigning the IP address for the local gateway co-located in the mobile relay node, wherein, the type of the assigned IP address is the same as the type of the IP address of the mobile relay node;

the assigning module 402 determining that the local gateway address assignment information includes the local gateway address assignment indication and the local gateway address type, and the local gateway address assignment indication indicating that the IP address is required to be assigned to the local gateway, then assigning the IP address for the local gateway co-located in the mobile relay node, wherein, the type of the assigned IP address is a type indicated by the local gateway address type; or the assigning module 402 determining that the local gateway address assignment information only includes the local gateway address type, then assigning the IP address for the local gateway co-located in the mobile relay node, wherein, the type of the assigned IP address is a type indicated by the local gateway address type.

The above-mentioned assigning module 402 includes an assignment control unit located in the destination donor NodeB and an assignment execution unit located in the data packet gateway, and the assignment control unit is configured to: perform the above-mentioned judgment for the local gateway address assignment information, to decide whether to assign the IP address for the local gateway and notify the assignment execution unit to perform the available assignment operation.

The sending module 403 is configured to send the IP address of the local gateway to a service gateway.

Preferably, the sending module is further configured to: after the assigning module 402 assigns the IP address for the local gateway, send the IP address assigned for the local gateway to the source donor NodeB (sending directly or sending through the MME), to make the source donor NodeB send the IP address of the local gateway to the mobile relay node; or, after the assigning module 402 assigns the IP address for the local gateway, send the IP address assigned for the local gateway to the mobile relay node directly (for example, sending through the RRC message or the S1 interface message or the X2 interface message, tec.).

Preferably, the sending module 403 can send the IP address of the local gateway to the service gateway by the adopting following ways:

in way one, the sending module 403 receives a first S1 interface message sent by the mobile relay node, sends a second S1 interface message to the MME serving the UE, wherein, both the first S1 interface message and the second S1 interface message include the IP address of the local gateway, and the UE is a UE accessing the mobile relay node; and sends the IP address of the local gateway to the service gateway serving the UE through the MME. Preferably, both the first S1 interface message and the second S1 interface message adopt a path shift request message.

In way two, the sending module 403 sends a third S1 interface message to the MME serving the UE, wherein, the third S1 interface message includes the IP address of the local gateway, and the UE is the UE accessing the mobile relay node; and sends the IP address of the local gateway to the service gateway serving the UE through the MME. Preferably, the third S1 interface message adopts a path shift request message.

Embodiment 3

Figure 5:
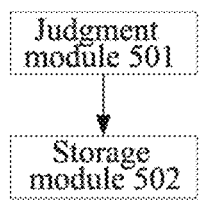
FIG. 5 is a structure diagram of a mobile relay node of embodiment 3 of the present document.

The present embodiment describes an apparatus for realizing updating a local gateway address. The apparatus is located in a mobile relay node, as shown in FIG. 5, including a judgment module 501 and a storage module 502, wherein:

the judgment module 501 is configured to: judge whether having received an IP address of a local gateway; and the storage module 502 is configured to: store the IP address of the local gateway when the judgment module determines that the IP address of the local gateway is received, and store the IP address of the mobile relay node as the IP address of the local gateway when the judgment module determines that the IP address of the local gateway is not received and determines that a present mobile relay node supports a local IP access (LIPA) function.

Preferably, the apparatus further includes a sending module, configured to: send a first S1 interface message to a destination donor NodeB, wherein, the first S1 interface message comprises the IP address of the local gateway. The first S1 interface message adopts a path shift request message.

Embodiment 4

Figure 6:
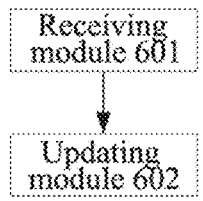
FIG. 6 is a structure diagram of a service gateway of embodiment 4 of the present document.

The present embodiment describes a service gateway serving for a user equipment (UE), as shown in FIG. 6, including a receiving module 601 and an updating module 602, wherein:

the receiving module 601 is configured to: receive an S11 interface message sent by a mobile management entity (MME); wherein, the S11 interface message comprises an IP address of a local gateway co-located in a mobile relay node; and the updating module 602 is configured to: update the IP address of the local gateway stored locally.

The above-mentioned embodiments are described in detail with reference to the application examples hereinafter. In the case of not conflicting, the application examples in the present application and features in these application examples can be combined with each other arbitrarily.

Application Example 1

Figure 7:
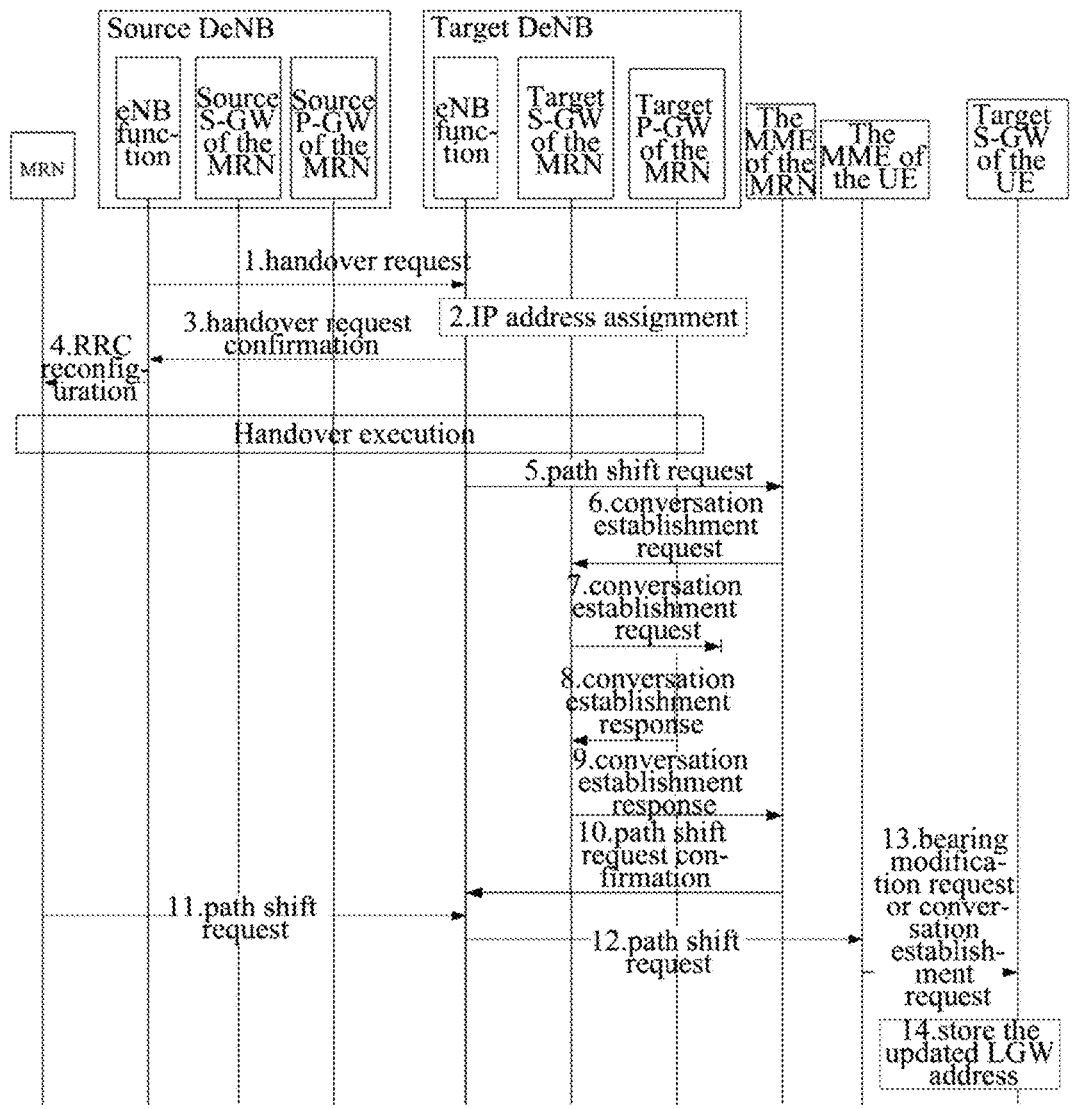
FIG. 7 is a flow chart of application example 1 of the present document.

The present example describes the method that the source DeNB sends the local gateway address assignment information to the target DeNB through the X2 interface message and the target DeNB assigns the IP address for the LGW in the handover and preparation process. FIG. 7 describes the procedure of the present example. In the present example, the source SGW and the source PGW of the MRN may be built in the source DeNB, and also may not be located in the source DeNB but built in the initial DeNB. As shown in FIG. 7, it includes the following steps.

In step 1, the MRN detects the signal of the target DeNB cell in the measurement process, and triggers a measurement report event to send the measurement report to the source DeNB; after the source DeNB confirms that the MRN needs to be handed over to the target DeNB, it determines that there is the X2 interface between the source DeNB and the target DeNB and the MRN does not need to change the MME after the handover, then the source DeNB initiates the X2 handover for the MRN, and the source DeNB sends the X2 interface handover request message to the target DeNB; and the handover request message includes the local gateway address assignment information.

The local gateway address assignment information includes at least one of the following: the local gateway address assignment indication and the local gateway address type. Wherein, the local gateway address assignment indication is used for indicating whether it needs to assign the IP address for the LGW; the local gateway address type is used for indicating the type of the IP address of the LGW required to be assigned. Alternatively, the handover request message can also include the indicating information that the MRN supports the LIPA function, used for indicating whether the handover MRN supports the LIPA function. The source DeNB judges whether the MRN supports the LIPA function according to whether the S1 interface message which is received before the handover and sent for the UE by the MRN includes the address information of the local gateway. In addition, the handover request message can also carry the context information of the MRN and the UE, and here the UE refers to the UE accessing the MRN.

In step 2, after the target DeNB receives the handover request message, if the local gateway address assignment information in the message indicates that it needs to assign the IP address for the LGW, then the MRN PGW built in the target DeNB assigns the IP address for the LGW according to the received local gateway address assignment information; if the local gateway address assignment information includes the local gateway address type, then the MRN PGW assigns the IP address of that type for the LGW; if the local gateway address assignment information does not include the local gateway address type, then the address type assigned for the LGW by the MRN PGW is same as the address type assigned for the MRN.

If the local gateway address assignment information only includes the local gateway address type, it can be regarded as a way of implicit indication that it needs to assign the IP address for the LGW.

In step 3, after the target DeNB establishes the context of the MRN and the UE and reserves the relevant bearing resources, it sends the handover request confirmation message of the X2 interface to the source DeNB; wherein, it includes the IP address assigned for the LGW by the MRN PGW.

Alternatively, the IP address of the LGW can be carried in the Target eNB To Source eNB Transparent Container.

In step 4, the source DeNB sends the air interface message RRC connection reconfiguration message to the MRN, and the RRC connection reconfiguration message carries the transparent handover command message sent to the MRN through the source DeNB by the target DeNB in the Target eNB To Source eNB Transparent Container. The source DeNB can send the IP address of the LGW to the MRN through the message; and in addition, the source DeNB can also send the IP address of the LGW to the MRN through the S1 or the X2 interface message.

It is more rational to adopt the RRC connection reconfiguration message, but besides the RRC connection reconfiguration message, it also can be realized by adopting other RRC messages.

In step 5, in the handover execution stage, the MRN is de-attached from the source DeNB and is synchronized with the target DeNB and establishes the RRC connection. After the target DeNB receives the RRC reconfiguration completion message sent by the MRN, it sends the path handover request message to the MME of the MRN, in order to update the S1 user plane and the control plane path of the RN. And the message includes the SGW and the PGW address built in the target DeNB (that is, the target SGW and PGW of the MRN), to assist the MME to reposition the SGW and the PGW of the MRN.

In step 6, the MME of MRN repositions the SGW and PGW of the MRN as the addresses of the SGW and the PGW built in the target DeNB according to the addresses of the target SGW and PGW sent by the target DeNB, and the MME of the MRN the conversation establishment request to the SGW in the target DeNB; wherein, it includes the bearing information of the evolution packet system (EPS) of the MRN required to be established and the address of the target PGW (the PGW built in the target DeNB).

In step 7, the target SGW establishes the context of the MRN, and sends the conversation establishment request message to the target PGW.

In step 8, after the target PGW establishes the context of the MRN and the EPS bearing, it replies the conversation establishment response message to the target SGW.

The signaling in both above-mentioned step 7 and step 8 is the internal interface message in the target DeNB.

In step 9, the target SGW replies the conversation establishment response message to the MME of the MRN, in order to confirm that the context of the MRN and the EPS bearing are established completely.

In step 10, the MME of the MRN replies the path shift request confirmation message to the target DeNB.

In step 11, the MRN sends the path shift request message to the target DeNB for each UE, in order to update the S1 user plane and the control plane path of every UE; wherein, it includes the bearing information required to be shifted in the downlink, etc.

In the present example, the MRN supports the LIPA function, then the path shift request message includes the IP address assigned for the LGW by the MRN PGW in the handover process.

It should be noted that the path shift process for each UE can be initiated by the MRN, and also can be initiated by the target DeNB directly; if it is initiated by the target DeNB directly, then step 11 can be jumped over.

In step 12, the target DeNB performs the S1 agent to the received path shift request message for each UE and then sends to the MME of the UE, and every message includes the IP address assigned for the LGW by the MRN PGW in the handover over process.

If the path shift process for each UE is initiated by the target DeNB directly and the target DeNB assigns the IP address for the LGW according to the local gateway address assignment information, then the target DeNB sends the path shift request message to the MME of the UE for each UE, and the message includes the IP address assigned for the LGW.

If the path shift process for each UE is initiated by the target DeNB directly and the target DeNB does not need to assign the IP address for the LGW, then the target DeNB judges whether the MRN serving the UE supports the LIPA function according to the indicating information that the MRN supports the LIPA function in the handover request message received in step 1; if it is supported, then it considers that the LGW and the MRN use the same IP address, and regard the address of the MRN as the address of the LGW and send to the MME of the UE through the path shift request message.

In step 13, the MME of the UE judges whether it needs to reselect one SGW for the UE; if it does not need, then the target SGW of the UE also refers to the source SGW of the UE in FIG. 7; the MME of the UE sends the bearing modification request message to the target SGW of the UE for each PDN connection of the UE, and the bearing modification request message includes the address of the updated LGW. If the MME of the UE needs to reselect one SGW, then the target SGW of the UE and the source SGW of the UE as shown in FIG. 7 are different SGWs; the MME of the UE sends the conversation establishment request message to the target SGW of the UE for each PDN connection of the UE, and the conversation establishment request message corresponding to the LIPA PDN connection of the UE includes the address of the updated LGW.

In step 14, the target SGW of the UE updates the address of the LGW, and continues to complete the process of modifying the bearing or conversation establishment.

Application Example 2

Figure 8:
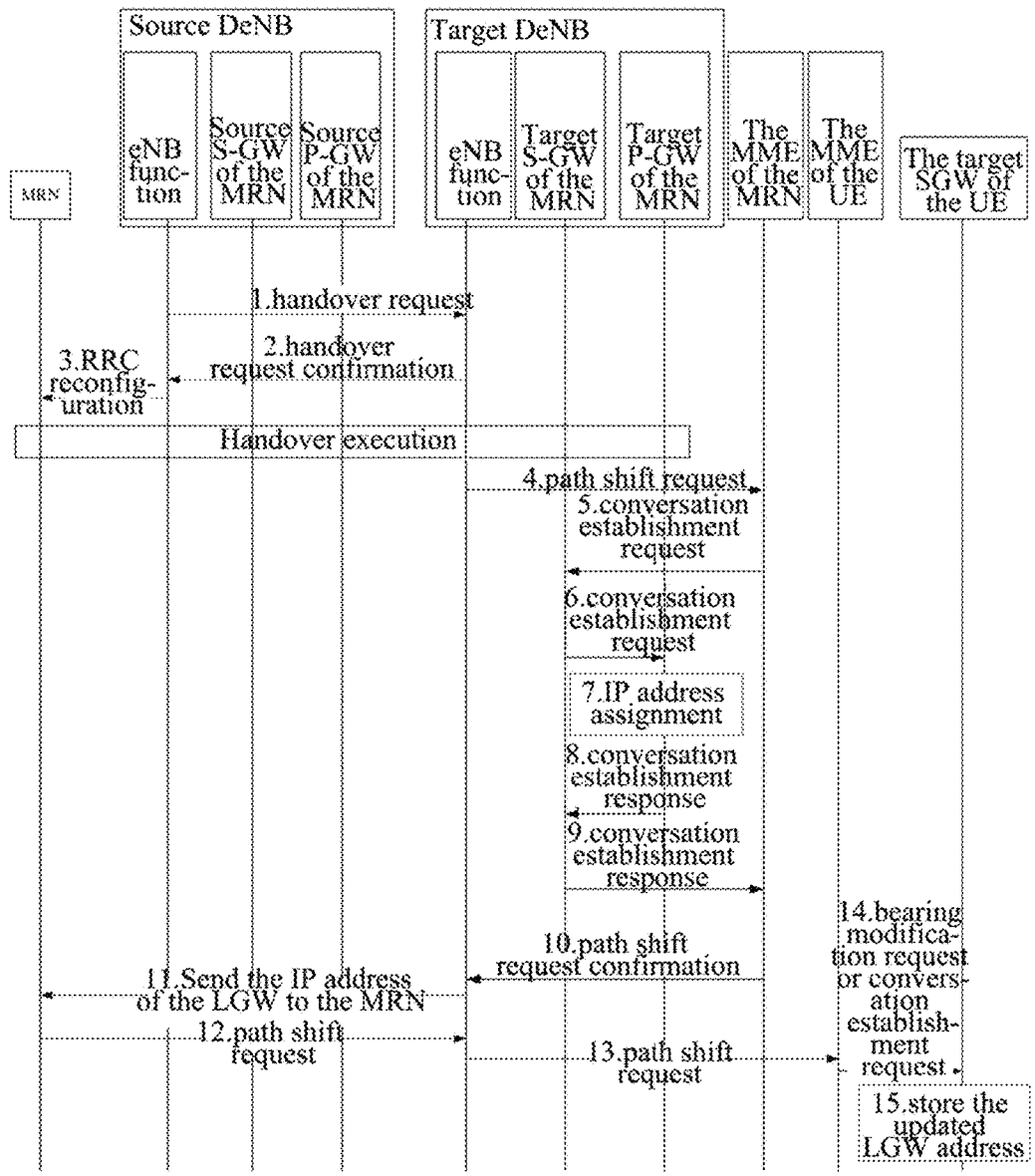
FIG. 8 is a flow chart of application example 2 of the present document.

The present example describes the method that the source DeNB sends the local gateway address assignment information to the target DeNB through the X2 interface message and the target DeNB assigns the IP address for the LGW in the conversation establishment process. FIG. 8 describes the procedure of the present example. In the present example, the source SGW and the source PGW of the MRN may be built in the source DeNB, and also may not be located in the source DeNB but built in the initial DeNB. As shown in FIG. 8, it includes the following steps.

Step 1 is same with the step 1 in application example 1.

In step 2, after the target DeNB establishes the context of the MRN and the UE and reserves the relevant bearing resources, it sends the handover request confirmation message of the X2 interface to the source DeNB.

In step 3, the source DeNB sends the air interface message RRC connection reconfiguration message to the MRN, and the RRC connection reconfiguration message carries the transparent handover command message sent to the MRN through the source DeNB by the target DeNB.

Step 4 to step 6 are same with step 5 to step 7 in application example 1.

In step 7, if the local gateway address assignment information in the handover request message received by the target DeNB indicates that it needs to assign the IP address for the LGW, then the MRN PGW built in the target DeNB assigns the IP address for the LGW according to the received local gateway address assignment information; if the local gateway address assignment information includes the local gateway address type, then the MRN PGW assigns IP address of that type for the LGW; if the local gateway address assignment information does not include the local gateway address type, then the address type assigned for the LGW by the MRN PGW is same as the address type assigned for the MRN.

If the local gateway address assignment information only includes the local gateway address type, then it can be regarded as a way of implicit indication that it needs to assign the IP address for the LGW.

In step 8, after the target PGW establishes the context of the MRN and the EPS bearing, it replies the conversation establishment response message to the target SGW.

The signaling in both above-mentioned step 6 and step 8 is the internal interface message in the target DeNB.

In step 9, the target SGW replies the conversation establishment response message to the MME of the MRN, in order to confirm that the context of the MRN and the EPS bearing are established completely.

In step 10, the MME of the MRN replies the path shift request confirmation message to the target DeNB.

In step 11, the target DeNB sends the IP address assigned for the LGW by the MRN PGW to the MRN, which can through the RRC connection reconfiguration message or the S1 or the X2 message.

Step 12 to step 15 are same with step 11 to step 14 in application example 1.

Application Example 3

Figure 9:
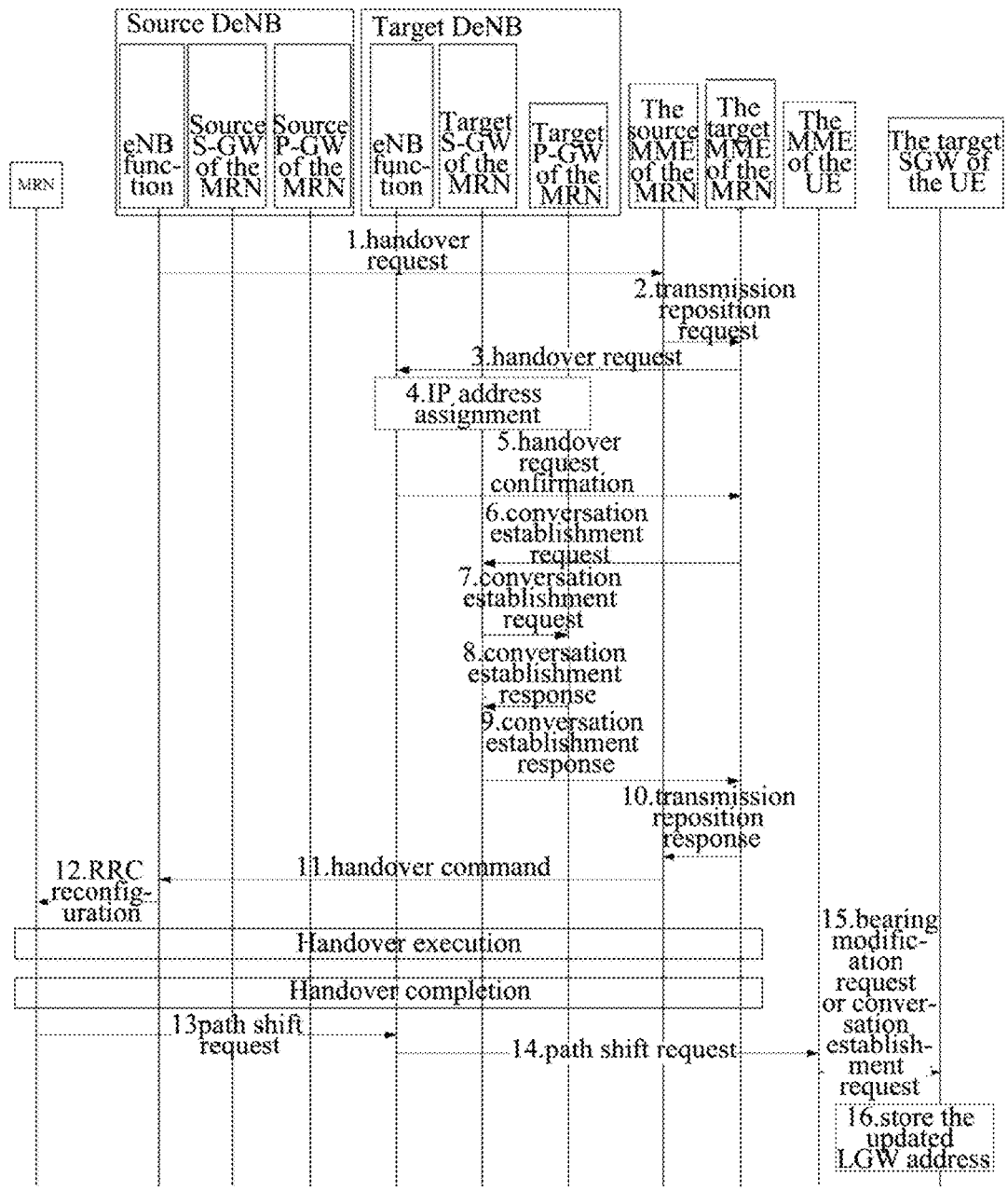
FIG. 9 is a flow chart of application example 3 of the present document.

The present example describes the method that the target DeNB assigns the IP address in the handover and preparation process in the S1 handover. FIG. 9 describes the procedure of the present example. In the present example, the source SGW and the source PGW of the MRN may be built in the source DeNB, and also may not be located in the source DeNB but built in the initial DeNB. As shown in FIG. 9, it includes the following steps.

In step 1, the MRN detects the signal of the target DeNB cell in the measurement process, and triggers a measurement report event to send the measurement report to the source DeNB; after the source DeNB confirms that the MRN needs to be handed over to the target DeNB, it determines that there is no X2 interface between the source DeNB and the target DeNB or the MRN does not need to change the MME after the handover, then the source DeNB initiates the S1 handover for the MRN, and the source DeNB sends the S1 interface handover required message to the source MME of the MRN; and the handover required message includes the local gateway address assignment information.

The local gateway address assignment information includes at least one of the following: the local gateway address assignment indication and the local gateway address type. Wherein, the local gateway address assignment indication is used for indicating whether it needs to assign the IP address for the LGW; the local gateway address type is used for indicating the type of the IP address of the LGW required to be assigned. Alternatively, the handover required message can also include the indicating information that the MRN supports the LIPA function, used for indicating whether the handover MRN supports the LIPA function. The local gateway address assignment information can be carried in the Source eNB To Target eNB Transparent Container.

In step 2, the source MME judges whether to select a new MME according to a NodeB identification or target tracking area identification (TAI) of the target DeNB in the received handover required message; if it is required, then the target MME is selected according to these two parameters, and a transmission reposition request message is sent to it; wherein, it carries the information, such as, the Source eNB To Target eNB Transparent Container, the target DeNB identification, the target location area identification, the context information of the MRN, etc. The transmission reposition request message includes the local gateway address assignment information (which can be carried in the transparent container); if the source MME receives the indication information that the MRN supports the LIPA function, then the message also includes the indication information that the MRN supports the LIPA function.

If it does not need to select the new MME, then step 2 and step 10 are jumped over.

In step 3, the target MME of the MRN sends the S1 interface handover request message to the target DeNB, wherein, it includes the local gateway address assignment information, and alternatively it also includes the indication information that the MRN supports the LIPA function.

In step 4, after the target DeNB receives the handover request message, if the local gateway address assignment information in the message indicates that it needs to assign the IP address for the LGW, then the MRN PGW built in the target DeNB assigns the IP address for the LGW according to the received local gateway address assignment information; if the local gateway address assignment information includes the local gateway address type, then the MRN PGW assigns the IP address of that type for the LGW; if the local gateway address assignment information does not include the local gateway address type, then the address type assigned for the LGW by the MRN PGW is same as the address type assigned for the MRN.

If the local gateway address assignment information only includes the local gateway address type, then it can be regarded as a way of implicit indication that it needs to assign the IP address for the LGW.

In step 5, after the target DeNB establishes the context for the MRN and the UE and reserves the resources for the bearing of the MRN, it sends the handover request confirmation message to the target MME of the MRN; wherein, the message includes the IP address assigned for the LGW by the target PGW, which can be carried in the Target eNB To Source eNB Transparent Container. And the message also can include the IP address of the target SGW and the target PGW on the target DeNB, to assist the MME to reposition the SGW and the PGW of the MRN.

In step 6, the target MME of MRN repositions the SGW and PGW of the MRN as the addresses of the SGW and the PGW built in the target DeNB according to the addresses of the target SGW and PGW sent by the target DeNB, and the MME of the MRN the conversation establishment request to the SGW in the target DeNB; wherein, it includes the bearing information of the evolution packet system (EPS) of the MRN required to be established and the address of the target PGW (the PGW built in the target DeNB).

In step 7, the target SGW establishes the context of the MRN, and sends the conversation establishment request message to the target PGW.

In step 8, after the target PGW establishes the context of the MRN and the EPS bearing, it replies the conversation establishment response message to the target SGW.

The signaling in both above-mentioned step 7 and step 8 is the internal interface message in the target DeNB.

In step 9, the target SGW replies the conversation establishment response message to the MME of the MRN, in order to confirm that the context of the MRN and the EPS bearing are established completely.

In step 10, the target MME of the MRN sends the transmission reposition response message to the source MME. The message includes the IP address assigned for the LGW by the target PGW.

In step 11, the source MME of the MRN sends the handover command message to the source DeNB, and the message includes the IP address assigned for the LGW by the target PGW.

In step 12, the source DeNB sends the RRC reconfiguration message to the MRN, and the message can carry the IP address assigned for the LGW by the target PGW, and the source DeNB can also send the IP address assigned for the LGW by the target PGW to the MRN through the S1 or the X2 message.

Step 13 to step 16 are same with step 11 to step 14 in application example 1.

Application Example 4

Figure 10:
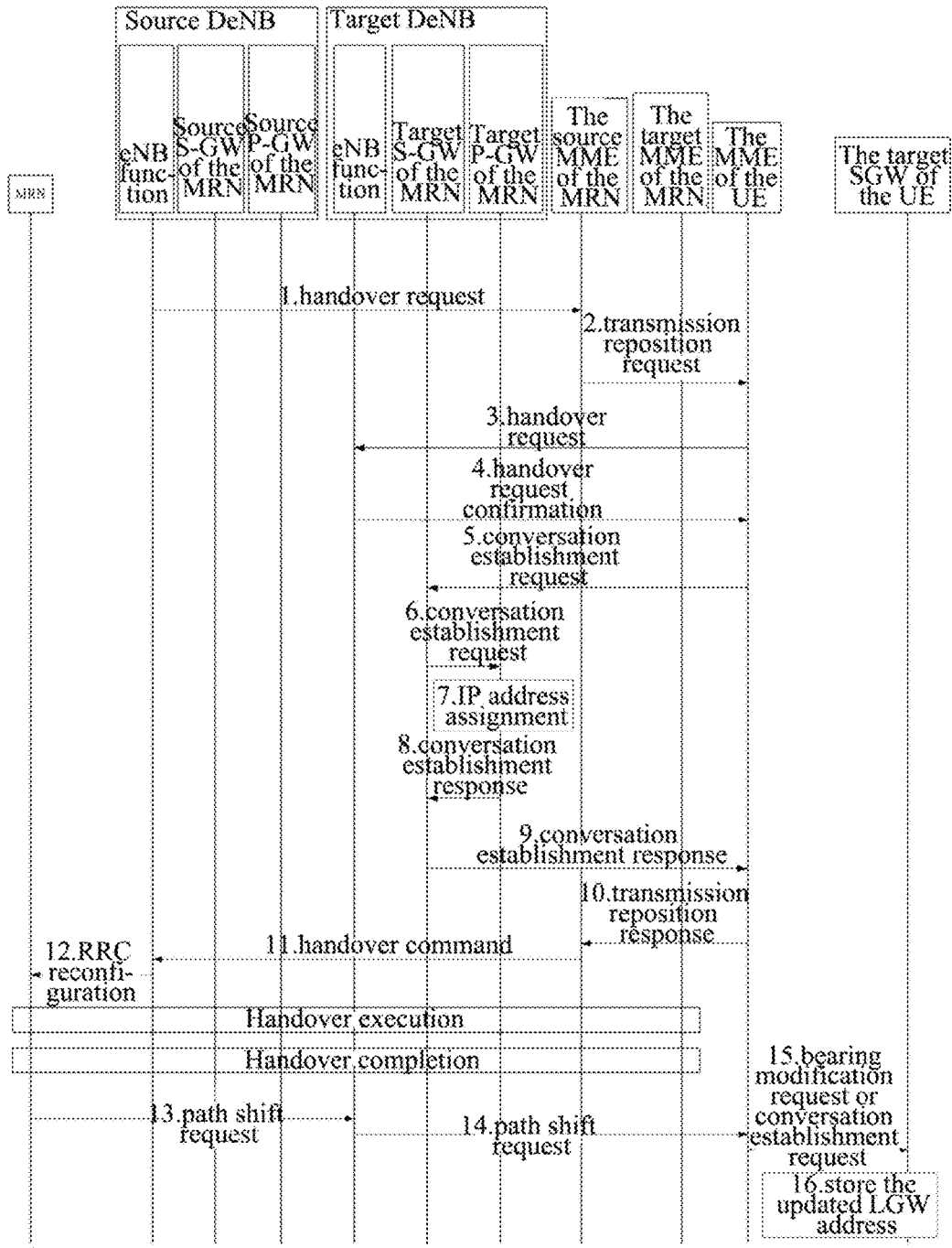
FIG. 10 is a flow chart of application example 4 of the present document.

The present example describes the method that the target DeNB assigns the IP address in the handover and preparation process in the S1 handover. FIG. 10 describes the procedure of the present example. In the present example, the source SGW and the source PGW of the MRN may be built in the source DeNB, and also may not be located in the source DeNB but built in the initial DeNB. As shown in FIG. 10, it includes the following steps.

Step 1 to step 3 are same with the step 1 to step 3 in application example 3.

In step 4, after the target DeNB establishes the context for the MRN and the UE and reserves the resources for the bearing of the MRN, it sends the handover request confirmation message to the target MME of the MRN; wherein, the message includes the IP address of the target SGW and the target PGW on the target DeNB, to assist the MME to reposition the SGW and the PGW of the MRN.

In step 5, the target MME of MRN repositions the SGW and PGW of the MRN as the addresses of the SGW and the PGW built in the target DeNB according to the addresses of the target SGW and PGW sent by the target DeNB, and the MME of the MRN the conversation establishment request to the SGW in the target DeNB; wherein, it includes the bearing information of the evolution packet system (EPS) of the MRN required to be established and the address of the target PGW (the PGW built in the target DeNB).

In step 6, the target SGW establishes the context of the MRN, and sends the conversation establishment request message to the target PGW.

In step 7, if the local gateway address assignment information in the handover request message received by the target DeNB indicates that it needs to assign the IP address for the LGW, then the MRN PGW built in the target DeNB assigns the IP address for the LGW according to the received local gateway address assignment information; if the local gateway address assignment information includes the local gateway address type, then the MRN PGW assigns the IP address of that type for the LGW; if the local gateway address assignment information does not include the local gateway address type, then the address type assigned for the LGW by the MRN PGW is same as the address type assigned for the MRN.

If the local gateway address assignment information only includes the local gateway address type, then it can be regarded as a way of implicit indication that it needs to assign the IP address for the LGW.

In step 8, after the target PGW establishes the context of the MRN and the EPS bearing, it replies the conversation establishment response message to the target SGW. The message includes the IP address assigned for the LGW by the target PGW.

The signaling in both above-mentioned step 6 and step 8 is the internal interface message in the target DeNB.

In step 9, the target SGW replies the conversation establishment response message to the MME of the MRN, in order to confirm that the context of the MRN and the EPS bearing are established completely. The message includes the IP address assigned for the LGW by the target PGW.

In step 10, the target MME of the MRN sends the transmission reposition response message to the source MME. The message includes the IP address assigned for the LGW by the target PGW.

In step 11, the source MME of the MRN sends the handover command message to the source DeNB, and the message includes the IP address assigned for the LGW by the target PGW.

In step 12, the source DeNB sends the RRC reconfiguration message to the MRN, and the message can carry the IP address assigned for the LGW by the target PGW, and the source DeNB can also send the IP address assigned for the LGW by the target PGW to the MRN through the S1 or the X2 message.

Step 13 to step 16 are same with step 11 to step 14 in application example 1.

It needs to be noted that the embodiments as shown in the above-mentioned FIG. 9 and FIG. 10 are suitable for the scene that the MME of the MRN does not change in the handover process as well; if the MME does not change, then all the messages transmitted between the sources MME and the target MME can be omitted, and the behaviors of the source MME and the target MME are the behaviors of one same MME.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

Obviously, the present document can have a variety of other embodiments. Those skilled in the art can make the corresponding modifications and variations according to technical scheme and the conception of the present document without departing from the spirit and essence of the present document. And all of these modifications or the variations should be embodied in the scope of the appending claims of the present document.

INDUSTRIAL APPLICABILITY

By using the method and apparatus of the embodiment of the present document, under the situation that the MRN supports the LIPA and the PGW serving the MRN is repositioned in the MRN handover process, it can solve the problem of updating the LGW address in the handover process, in order to guarantee the continuity of the S5 connection, and then guarantee the service continuity of the terminal. So the present document has very strong industrial practicability.

What we claim is:

1. A method for updating a local gateway address, comprising:
   a destination donor NodeB receiving local gateway address assignment information;
   according to the local gateway address assignment information, if the destination donor NodeB determines that an IP address is required to be assigned to a local gateway co-located in a mobile relay node, then assigning the IP address to the local gateway; and
   sending the IP address of the local gateway to a service gateway.

2. The method according to claim 1, further comprising:
   if the destination donor NodeB does not receive the local gateway address assignment information, then the destination donor NodeB does not assign the IP address for the local gateway, storing the IP address of the mobile relay node as the IP address of the local gateway when determining that the mobile relay node supports a local IP access (LIPA) function; if the mobile relay node determines that the IP address of the local gateway is not received and the present mobile relay node supports the LIPA function, then storing an IP address of the mobile relay node itself as the IP address of the local gateway; wherein
      the destination donor NodeB judges whether the mobile relay node supports the LIPA function by adopting the following ways:
      the destination donor NodeB judging whether having received mobile relay nodeLIPA function support indication information from a source donor NodeB, wherein, the mobile relay node LIPA function support indication information is used for indicating whether the mobile relay node supports the LIPA function;
      if the destination donor NodeB receives the mobile relay node LIPA function support indication information and the mobile relay node LIPA function support indication information indicates that the mobile relay node supports the LIPA function, then the destination donor NodeB determining that the mobile relay node supports the LIPA function; and
      if the destination donor NodeB receives the mobile relay node LIPA function support indication information and the mobile relay node LIPA function support indication information indicates that the mobile relay node does not support the LIPA function, or the destination donor NodeB does not receive the mobile relay node LIPA function support indication information, then the destination donor NodeB determining that the mobile relay node does not support the LIPA function;

or,
if the destination donor NodeB determines that the IP address is not required to be assigned for the local gateway co-located in the mobile relay node according to the local gateway address assignment information, then the destination donor NodeB does not assign the IP address for the local gateway, storing the IP address of the mobile relay node as the IP address of the local gateway when determining that the mobile relay node supports a local IP access (LIPA) function; if the mobile relay node determines that the IP address of the local gateway is not received and the present mobile relay node supports the LIPA function, then storing an IP address of the mobile relay node itself as the IP address of the local gateway; wherein
   the destination donor NodeB judges whether the mobile relay node supports the LIPA function by adopting the following ways:
   the destination donor NodeB judging whether having received mobile relay nodeLIPA function support indication information from a source donor NodeB, wherein, the mobile relay node LIPA function support indication information is used for indicating whether the mobile relay node supports the LIPA function;
   if the destination donor NodeB receives the mobile relay node LIPA function support indication information and the mobile relay node LIPA function support indication information indicates that the mobile relay node supports the LIPA function, then the destination donor NodeB determining that the mobile relay node supports the LIPA function; and
   if the destination donor NodeB receives the mobile relay node LIPA function support indication information and the mobile relay node LIPA function support indication information indicates that the mobile relay node does not support the LIPA function, or the destination donor NodeB does not receive the mobile relay node LIPA function support indication information, then the destination donor NodeB determining that the mobile relay node does not support the LIPA function;

or,
wherein, the step of the destination donor NodeB receiving the local gateway address assignment information comprising:
   the destination donor NodeB receiving an X2 interface handover request message carrying the local gateway address assignment information sent by a source donor NodeB of the mobile relay node; or,
   the destination donor NodeB receiving an S1 interface handover request message carrying the local gateway address assignment information sent by a mobility management entity (MME), wherein, the MME is an MME that serves the mobile relay node, and the local gateway address assignment information in the S1 interface handover request message is sent to the MME from the source donor NodeB.

3. The method according to claim 1, wherein:
the local gateway address assignment information comprises at least one of following: a local gateway address assignment indication, and a local gateway address type;
wherein, the local gateway address assignment indication is used for indicating whether the IP address is required to be assigned to the local gateway, and the local gateway address type is used for indicating a type of the IP address of the local gateway required to be assigned.

4. The method according to claim 3, wherein, the step of according to the local gateway address assignment information, if the destination donor NodeB determines that the IP address is required to be assigned to the local gateway co-located in the mobile relay node, then assigning the IP address to the local gateway comprises:
the destination donor NodeB determining that the local gateway address assignment information only comprises the local gateway address assignment indication, and the local gateway address assignment indication indicating that the IP address is required to be assigned to the local gateway, then a data packet gateway serving the mobile relay node in the destination donor NodeB assigning the IP address for the local gateway co-located in the mobile relay node, wherein, the type of the IP address is the same as the type of the IP address of the mobile relay node; or,
the destination donor NodeB determining that the local gateway address assignment information comprises the local gateway address assignment indication and the local gateway address type, and the local gateway address assignment indication indicating that the IP address is required to be assigned to the local gateway, then the data packet gateway serving the mobile relay node in the destination donor NodeB assigning the IP address for the local gateway co-located in the mobile relay node, wherein, the type of the IP address is a type indicated by the local gateway address type; or
the destination donor NodeB determining that the local gateway address assignment information only comprises the local gateway address type, then the data packet gateway serving the mobile relay node in the destination donor NodeB assigning the IP address for the local gateway co-located in the mobile relay node, wherein, the type of the IP address is a type indicated by the local gateway address type.

5. The method according to claim 4, after the destination donor NodeB assigns the IP address for the local gateway, the method further comprising:
the destination donor NodeB sending the IP address assigned for the local gateway to the source donor NodeB, and the source donor NodeB sending the IP address of the local gateway to the mobile relay node; or,
the destination donor NodeB sending the IP address assigned for the local gateway to the mobile relay node directly.

6. The method according to claim 5,
wherein, the step of the destination donor NodeB sending the IP address assigned for the local gateway to the source donor NodeB comprises:
the destination donor base sending the IP address assigned for the local gateway to the source donor NodeB directly; or,
the destination donor NodeB sending the IP address assigned for the local gateway to the source donor NodeB through the MME;
or,
wherein, the step of the source donor NodeB sending the IP address of the local gateway to the mobile relay node comprises: the source donor NodeB sending the IP address of the local gateway to the mobile relay node through a radio resource control (RRC) message, an S1 interface message or an X2 interface message;
or,
wherein, the step of the destination donor NodeB sending the IP address of the local gateway to the mobile relay node directly comprises: the destination donor NodeB sending the IP address of the local gateway to the mobile relay node through a radio resource control (RRC) message, an S1 interface message or an X2 interface message.

7. The method according to claim 2, wherein, the step of sending the IP address of the local gateway to the service gateway comprises:
the destination donor NodeB receiving a first S1 interface message sent by the mobile relay node, sending a second S1 interface message to the MME serving the UE, wherein, both the first S1 interface message and the second S1 interface message comprise the IP address of the local gateway, and the UE is a UE accessing the mobile relay node; and the MME sending a first S11 interface message to the service gateway serving the UE, in order to make the service gateway update the IP address of the local gateway stored locally, wherein, the first S11 interface message comprises the IP address of the local gateway;
wherein, both the first S1 interface message and the second S1 interface message adopt a path shift request message, and the first S11 interface message adopts a bearing modification request message or a conversation establishment request message.

8. The method according to claim 2, wherein, the step of sending the IP address of the local gateway to the service gateway comprises:
the destination donor NodeB sending a third S1 interface message to the MME serving the UE, wherein, the third S1 interface message comprises the IP address of the local gateway, and the UE is the UE accessing the mobile relay node; the MME sending a second S11 interface message to the service gateway serving the UE, in order to make the service gateway update the IP address of the local gateway stored locally, wherein, the second S11 interface message comprises the IP address of the local gateway;
wherein, the third S1 interface message adopts a path shift request message; and the second S11 interface message adopts a bearing modification request message or a conversation establishment request message.

9. An apparatus for updating a local gateway address, located in a destination donor NodeB, comprising hardware performing instructions stored in a non-transitory computer readable medium which executes steps in following modules: a receiving module, an assigning module and a sending module, wherein:
the receiving module is configured to: receive local gateway address assignment information;
the assigning module is configured to: according to the local gateway address assignment information, if determining that an IP address is required to be assigned to a local gateway co-located in a mobile relay node, then assign the IP address to the local gateway; and the sending module is configured to: send the IP address of the local gateway to a service gateway.

10. The apparatus according to claim 9,
wherein, the assigning module is further configured to:
when the receiving module does not receive the local gateway address assignment information, then not assign the IP address for the local gateway; and when determining that the mobile relay node supports a local IP access (LIPA) function, store the IP address of the mobile relay node as the IP address of the local gateway; wherein
the assigning module is configured to judge whether the mobile relay node supports the LIPA function by adopting the following ways:
the assigning module judging whether having received mobile relay node LIPA function support indication information from a source donor NodeB, wherein, the mobile relay node LIPA function support indication information is used for indicating whether the mobile relay node supports the LIPA function;
if the assigning module receives the mobile relay node LIPA function support indication information and the mobile relay node LIPA function support indication information indicates that the mobile relay node supports the LIPA function, then the assigning module determining that the mobile relay node supports the LIPA function; and
if the assigning module receives the mobile relay node LIPA function support indication information and the mobile relay node LIPA function support indication information indicates that the mobile relay node does not support the LIPA function, or the assigning module does not receive the mobile relay node LIPA function support indication information, then the assigning module determining that the mobile relay node does not support the LIPA function;

or wherein, the assigning module is further configured to: if determining that the IP address is not required to be assigned for the local gateway co-located in the mobile relay node according to the local gateway address assignment information, then not assign the IP address for the local gateway; and when determining that the mobile relay node supports a local IP access (LIPA) function, store the IP address of the mobile relay node as the IP address of the local gateway; wherein
the assigning module is configured to judge whether the mobile relay node supports the LIPA function by adopting the following ways:
the assigning module judging whether having received mobile relay node LIPA function support indication information from a source donor NodeB, wherein, the mobile relay node LIPA function support indication information is used for indicating whether the mobile relay node supports the LIPA function;
if the assigning module receives the mobile relay node LIPA function support indication information and the mobile relay node LIPA function support indication information indicates that the mobile relay node supports the LIPA function, then the assigning module determining that the mobile relay node supports the LIPA function; and
if the assigning module receives the mobile relay node LIPA function support indication information and the mobile relay node LIPA function support indication information indicates that the mobile relay node does not support the LIPA function, or the assigning module does not receive the mobile relay node LIPA function support indication information, then the assigning module determining that the mobile relay node does not support the LIPA function;

or, wherein, the receiving module is configured to receive the local gateway address assignment information by the following ways:
the receiving module receiving an X2 interface handover request message carrying the local gateway address assignment information sent by a source donor NodeB of the mobile relay node; or,
the receiving module receiving an S1 interface handover request message carrying the local gateway address assignment information sent by a mobile management entity (MME), wherein, the MME is an MME that serves the mobile relay node, and the local gateway address assignment information in the S1 interface handover request message is sent to the MME from the source donor NodeB.

11. The apparatus according to claim 9, wherein:
the local gateway address assignment information comprises at least one of following: a local gateway address assignment indication, and a local gateway address type;
wherein, the local gateway address assignment indication is used for indicating whether the IP address is required to be assigned to the local gateway, and the local gateway address type is used for indicating a type of the IP address of the local gateway required to be assigned.

12. The apparatus according to claim 11, wherein, the assigning module is configured to: according to the local gateway address assignment information, if determining that the IP address is required to be assigned to the local gateway co-located in the mobile relay node, then assign the IP address to the local gateway by the following ways:
the assigning module determining that the local gateway address assignment information only comprises the local gateway address assignment indication, and the local gateway address assignment indication indicating that the IP address is required to be assigned to the local gateway, then the assigning module assigning the IP address for the local gateway co-located in the mobile relay node, wherein, the type of the IP address is the same as the type of the IP address of the mobile relay node; or,
the assigning module determining that the local gateway address assignment information comprises the local gateway address assignment indication and the local gateway address type, and the local gateway address assignment indication indicating that the IP address is required to be assigned to the local gateway, then the assigning module assigning the IP address for the local gateway co-located in the mobile relay node, wherein, the type of the IP address is a type indicated by the local gateway address type; or
the assigning module determining that the local gateway address assignment information only comprises the local gateway address type, then the assigning module assigning the IP address for the local gateway co-located in the mobile relay node, wherein, the type of the IP address is a type indicated by the local gateway address type.

13. The apparatus according to claim 12, wherein, the sending module is further configured to:

after the assigning module assigns the IP address for the local gateway, send the IP address assigned for the local gateway to the source donor NodeB, to make the source donor NodeB send the IP address of the local gateway to the mobile relay node; or, after the assigning module assigns the IP address for the local gateway, send the IP address assigned for the local gateway to the mobile relay node directly.

14. The apparatus according to claim 13, wherein, the sending module is configured to send the IP address assigned for the local gateway to the source donor NodeB by the following ways: the sending module sending the IP address assigned for the local gateway to the source donor NodeB directly; or, the sending module sending the IP address assigned for the local gateway to the source donor NodeB through the MME;

or, wherein, the sending module is configured to send the IP address assigned for the local gateway to the mobile relay node directly after the assigning module assigns the IP address for the local gateway by the following ways: the sending module sending the IP address of the local gateway to the mobile relay node through a radio resource control (RRC) message, an S1 interface message or an X2 interface message.

15. The apparatus according to claim 10, wherein, the sending module is configured to send the IP address of the local gateway to the service gateway by the following ways: the sending module receiving a first S1 interface message sent by the mobile relay node, sending a second S1 interface message to the MME serving the UE, wherein, both the first S1 interface message and the second S1 interface message comprise the IP address of the local gateway, and the UE is a UE accessing the mobile relay node; and sending the IP address of the local gateway to the service gateway serving the UE through the MME;

wherein, both the first S1 interface message and the second S1 interface message adopt a path shift request message.

16. The apparatus according to claim 10, wherein, the sending module is configured to send the IP address of the local gateway to the service gateway by the following ways: the sending module sending a third S1 interface message to the MME serving the UE, wherein, the third S1 interface message comprises the IP address of the local gateway, and the UE is the UE accessing the mobile relay node; and sending the IP address of the local gateway to the service gateway serving the UE through the MME;

wherein the third S1 interface message adopts a path shift request message.

17. The apparatus according to claim 9, located in a mobile relay node, comprising hardware performing instructions stored in a non-transitory computer readable medium which executes steps in following modules: a judgment module and a storage module, wherein:

the judgment module is configured to: judge whether having received an IP address of a local gateway; and the storage module is configured to: store the IP address of the local gateway when the judgment module determines that the IP address of the local gateway is received, and store the IP address of the mobile relay node as the IP address of the local gateway when the judgment module determines that the IP address of the local gateway is not received and determines that a present mobile relay node supports a local IP access (LIPA) function.

18. The apparatus according to claim 17, wherein the hardware performing instructions stored in the non-transitory computer readable medium further executes steps in a following module: a sending module, wherein:

the sending module is configured to: send a first S1 interface message to a destination donor NodeB, wherein, the first S1 interface message comprises the IP address of the local gateway.

19. The apparatus according to claim 18, wherein:

the first S1 interface message adopts a path shift request message.

20. The apparatus according to claim 9, located in a service gateway serving for a user equipment (UE), comprising hardware performing instructions stored in a non-transitory computer readable medium which executes steps in following modules: a receiving module and an updating module, wherein:

the receiving module is configured to: receive an S11 interface message sent by a mobile management entity (MME); wherein, the S11 interface message comprises an IP address of a local gateway co-located in a mobile relay node; and the updating module is configured to: update the IP address of the local gateway stored locally.

* * * * *